United States Patent [19]

Salvador et al.

[11] Patent Number: 4,744,913

[45] Date of Patent: May 17, 1988

[54] DE-ICING AND ANTI-ICING AGENT FOR AIRCRAFT

[75] Inventors: René Salvador, Neuötting; Josef Kapfinger; Erich Leidl, both of Burgkirchen, all of Fed. Rep. of Germany

[73] Assignee: Hoechst Aktiengesellschaft, Frankfurt am Main, Fed. Rep. of Germany

[21] Appl. No.: 11,266

[22] Filed: Feb. 4, 1987

[30] Foreign Application Priority Data

Feb. 6, 1986 [DE] Fed. Rep. of Germany ....... 3603583
Oct. 21, 1986 [DE] Fed. Rep. of Germany ....... 3635721

[51] Int. Cl.$^4$ .............................................. C09K 3/18
[52] U.S. Cl. ........................................ 252/70; 106/13
[58] Field of Search ............................. 252/70; 106/13

[56] References Cited

U.S. PATENT DOCUMENTS

| | | | |
|---|---|---|---|
| 2,798,053 | 7/1957 | Brown | 521/38 |
| 2,923,692 | 2/1960 | Ackerman et al. | 524/548 |
| 3,940,356 | 2/1976 | Byrnes | 252/70 |
| 4,237,249 | 12/1980 | Balzer et al. | 525/369 |
| 4,358,389 | 11/1982 | König-Lumer et al. | 252/70 |
| 4,585,571 | 4/1986 | Bloom | 252/70 |

FOREIGN PATENT DOCUMENTS

| | | | |
|---|---|---|---|
| 1940825 | 2/1971 | Fed. Rep. of Germany | 252/70 |
| 3142059 | 5/1983 | Fed. Rep. of Germany | 252/70 |
| 1285862 | 8/1972 | United Kingdom | 252/70 |

*Primary Examiner*—Robert Wax
*Assistant Examiner*—Ronald A. Krasnow

[57] ABSTRACT

The new agent, based on glycols and water and having crosslinked acrylic polymers as thickener and also customary corrosion inhibitors, surfactants belonging to the group of alkali metal alkylarylsulfonates and neutralizing agent to adjust the pH to a basic value, contains, as the thickener, two selected crosslinked acrylic polymers in a specific ratio by weight to one another, namely a selected crosslinked acrylic acid or alkali metal acrylate homopolymer and a selected crosslinked acrylic acid/acrylamide or alkali metal acrylate/acrylamide copolymer in a ratio by weight of 2 to 10:1 and, as the neutralizing agent, three alkaline compounds, each in a selected amount, namely ammonia, monoethanolamine, diethanolamine and/or triethanolamine as the first alkaline compound, potassium hydroxide as the second alkaline compound and a further alkali metal hydroxide as the third alkaline compound. The new agent exhibits the particular advantage that it has a relatively low viscosity even at arctic temperatures and low shear rates, which ensures rapid and complete runoff of the agent at the take-off of the aircraft even under extreme conditions.

8 Claims, No Drawings

DE-ICING AND ANTI-ICING AGENT FOR AIRCRAFT

The invention relates to a de-icing and anti-icing agent for aircraft, based on glycols and water and containing crosslinked acrylic polymers as the thickener.

An agent of this type is disclosed in U.S. Pat. No. 4,358,389. In detail, it is essentially composed of:

(1) 40 to 65% by weight of a glycol belonging to the group of alkylene glycols having 2 to 3 carbon atoms and oxalkylene glycols having 4 to 6 carbon atoms;

(2) 35 to 60% by weight of water;

(3) 0.05 to 1.5% by weight of a thickener belonging to the group of crosslinked polyacrylates having a viscosity of 1000 to 50,000 mPa s in a 0.5% strength by weight aqueous solution at 20° C. and a pH of 7.5 to 10 having a laminar flow behavior in a 0.1 to 1.5% strength by weight aqueous solution at +20° C., 0° C. and −10° C. and a pH of 7.5 to 10 with a shear rate of up to at least 20,000 seconds$^{-1}$;

(4) 0.05 to 1% by weight of a water-insoluble component belonging to the group of mineral oils of composite bases;

(5) 0.05 to 1% by weight of a surfactant belonging to the group of alkali metal alkylarylsulfonates;

(6) 0.01 to 1% by weight of at least one corrosion inhibitor; and (7) a sufficient amount of at least one alkaline compound belonging to the group of alkali metal carbonates, bicarbonates and hydroxides and amines for the agent to have a pH of 7.5 to 10, the amount of the components (1) and (2) in the agent being at least 94% by weight, relative to the weight of the agent.

This known aircraft de-icing and anti-icing agent has proved successful and is also frequently employed. It has now become clear that this agent leaves something to be desired in regard to viscosity-temperature behavior at very low temperatures, such as prevail, for example, in arctic regions (i.e. temperatures of about −20° to about −35° C.). Thus at the winter temperatures prevailing in Central Europe and similar regions (i.e. temperatures from 0° to about −15° C.), it displays the viscosity demanded and does so also at low shear rates, i.e. shear rates of up to about 20 seconds$^{-1}$ (low shear viscosity). However, at temperatures of less than about −15° C. and especially at temperatures from about −20° to about −35° C., it displays too high a viscosity, above all at low shear rates; thus, for example, its viscosity at −25° C. in a Brookfield viscometer at 0.3 revolutions per minute (r.p.m.) is 50,000 to 60,000 mPa s (values of 10,000 to 40,000 mPa s would be desired). How this works out in practice will be explained in greater detail below: the liquid formulation applied to the aircraft surface, in particular to the aerodynamically important parts of the surface, for deicing and as a protection against re-icing (while the aircraft is on the ground) should, as is known, run off completely during the take-off operation, so that the aircraft's inherent aerodynamics (above all ascending force) are assured during flight. With the known agent this indeed takes place in an entirely satisfactory manner at all the parts of the surface on which high shear rates occur; in these cases the viscosity of the agent falls off rapidly; it thus acquires a low viscosity and runs off rapidly and completely. However, on the parts of the surface at which relatively low shear rates occur (i.e. parts of the surface which are relatively quiet in aerodynamic terms, such as, for example, the rear part of the wing), the known liquid formulation runs off more slowly, especially at arctic temperatures, so that, as a result of excessively slow run-off, liquid is then still present on the parts mentioned after the take-off operation. In addition to this, modern aircraft possess, for example, wing structures which react particularly sensitively to icing or contamination. In order to ensure their full ascending force, these wings must, therefore, be absolutely free from ice and snow. In the case of these aircraft, therefore, protection against icing is required even under marginal conditions (+1° to −2° C.) and with only slight frost. In this case optimum run-off behavior of the applied agent is very particularly required, in order to have the full ascending force of the wing available as early as take-off, i.e. at the moment when rotation begins.

It is evident from the above description that the known aircraft de-icing and anti-icing agent, while retaining its good low shear viscosity (viscosity at rest) at about 0° to about −15° C., should be improved in such a way that it also exhibits only a relatively slight increase in viscosity when at a temperature less than −15° C. and, particularly, also at −20° to about −35° C., in order to ensure in this way good run-off even at low shear rates (i.e. at the quieter areas in aerodynamic terms). Since, as is known, there is a direct connection between the holdover space time (i.e. the interval of time within which—during the unavoidable delay between de-icing and take-off—protection is provided by the de-icing agent against re-icing accompanied by a freezing precipitate) and the viscosity at rest at a temperature from about 0° to about −15° C., this viscosity of the known agent should essentially be retained, but its viscosity at rest below −15° C. should be considerably reduced in order to adjust the run-off behavior of the agent during the take-off operation to the desired extent even at the quieter areas in terms of aerodynamics. There should, therefore, be available an aircraft de-icing and anti-icing agent which meets the high requirements for the viscosity when the aircraft takes off (because of the aerodynamic conditions then prevailing) within the whole temperature range from about 0° to about −35° C.

It has now been found, surprisingly, that the disadvantages of the known de-icing and anti-icing agent can be removed, and an agent having the desired properties mentioned obtained, if the thickener employed is a specific mixture of a crosslinked acrylic acid homopolymer and a selected, crosslinked acrylamide/acrylic acid copolymer or acrylamide/alkali metal acrylate copolymer and if the basic (alkaline) compounds employed to adjust the pH of the agent are three compounds differing from one another and matched to one another, each in a specific amount, specifically ammonia, monoethanolamine, diethanolamine and/or triethanolamine (the first basic compound), potassium hydroxide (the second basic compound) and a further (different) alkali metal hydroxide (the third basic compound). It has been found that the special combination mentioned of acrylic polymers makes it possible to achieve the desired viscosity and the desired flow behavior of the agents even at very low temperatures and low shear rates, if, additionally, and at the same time, the three alkaline compounds mentioned are present each one of which has a peculiar effect on the two acrylic polymers, for example in regard to swelling and viscosity-temperature behavior.

The new de-icing and anti-icing agent for aircraft, based on glycols and water and containing crosslinked acrylic polymers as the thickener, is essentially composed of:

(a) 40 to 70% by weight, preferably 50 to 60% by weight, of a glycol belonging to the group of alkylene glycols having 2 to 3 carbon atoms and oxalkylene glycols having 4 to 6 carbon atoms, (b) 0.1 to 1% by weight, preferably 0.2 to 0.7% by weight, of crosslinked acrylic polymers composed of 1 part by weight of a crosslinked copolymer formed from acrylic acid or an alkali metal acrylate and acrylamide containing 10 to 90% by weight, preferably 20 to 80% by weight, of copolymerized units of acrylic acid or of the alkali metal acrylate and 10 to 90% by weight, preferably 20 to 80% by weight, of copolymerized units of the acrylamide, and 1 to 10 parts by weight, preferably 3 to 8 parts by weight, of a crosslinked homopolymer of acrylic acid or of an alkali metal acrylate, subject to the proviso that the homopolymer and the copolymer each have a viscosity of 5000 to 70,000 mPa s, preferably 10,000 to 50,000 mPa s, and a laminar flow behavior at a shear rate from 0 to 20,000 seconds$^{-1}$, the viscosity and the laminar flow behavior each being determined using a 0.5% strength by weight aqueous solution at 20° C. and a pH of 7 by means of a Brookfield viscometer at 20 r.p.m. and a rotational viscometer for shear rates of up to 20,000 seconds$^{-1}$, respectively, (c) 0.05 to 1% by weight, preferably 0.1 to 0.7% by weight, of a surfactant belonging to the group of alkali metal alkylarylsulfonates, (d) 0.01 to 1% by weight, preferably 0.03 to 0.5% by weight, of at least one corrosion inhibitor, (e) the three following basic compounds $e_1$ to $e_3$ in the amounts indicated, for adjusting the pH of the agent to a value of 7.5 to 11, preferably 8 to 10:

($e_1$) 0.01 to 1% by weight, preferably 0.05 to 0.5% by weight, of ammonia, monoethanolamine, diethanolamine or triethanolamine or a mixture thereof (as the first basic component), ($e_2$) 0.05 to 0.7% by weight, preferably 0.07 to 0.4% by weight, of potassium hydroxide (as the second basic component) and ($e_3$) 0.01 to 0.5% by weight, preferably 0.03 to 0.15% by weight, of a further alkali metal hydroxide, preferably sodium hydroxide (as the third basic component), and (f) water, as the remaining percentage by weight, percentages by weight in each case being relative to the weight of the agent (weight of the finished agent or of the whole mixture, i.e. the sum of the components (a) to (f) is 100 percent by weight).

The component (a) in the de-icing and anti-icing agent according to the invention is preferably ethylene glycol, propylene glycol (1,2-propylene glycol or 1,3-propylene glycol) and/or diethylene glycol. The component (b) embraces two selected, crosslinked acrylic polymers in a definite ratio by weight, specifically a crosslinked homopolymer of acrylic acid or an alkali metal acrylate, preferably sodium acrylate or potassium acrylate, and a crosslinked copolymer formed from 10 to 90% by weight, preferably 20 to 80% by weight, of copolymerized acrylamide and 10 to 90% by weight, preferably 20 to 80% by weight, of copolymerized acrylic acid or a copolymerized alkali metal acrylate, preferably sodium acrylate or potassium acrylate, the percentages by weight relating to the copolymer, there being 1 to 10 parts by weight, preferably 3 to 8 parts by weight, of the homopolymer present for one part by weight of the copolymer. Each of the two crosslinked acrylic polymers employed is also of such a type as to have a specific viscosity and a special flow behavior, namely a viscosity of 5000 to 70,000 mPa s, preferably 10,000 to 50,000 mPa s, measured on a 0.5% strength by weight aqueous solution at 20° C. and a pH of 7 in a Brookfield viscometer at 20 r.p.m., and a laminar flow behavior in a 0.5% strength by weight aqueous solution at 20° C. and a pH of 7 at a shear rate of 0 to 20,000 seconds$^{-1}$ measured in a rotational viscometer (high shear rotation viscometer); it is evident from the resulting flow curve (viscosity gradient) at shear rates from 0 seconds$^{-1}$ up to the high figure of 20,000 seconds$^{-1}$ whether laminar or nonlaminar flow is taking place. The two acrylic polymers to be employed in accordance with the invention are known and are commercially available. The decisive factor is that they possess the abovementioned characteristics and properties. These are crosslinked acrylic polymers which are listed under the designation polyfunctionally statistically crosslinked acrylic polymers. As has been described in detail, for example in the two U.S. Pat. Nos. 2,798,053 and 2,923,692—the homopolymer is preferably prepared by polymerizing acrylic acid or an alkali metal acrylate in the presence of a free-radical initiator (catalyst) and a crosslinking agent having at least two polymerizable groups per molecule, preferably $CH_2=C<$ groups, and by isolating the pulverulent polymer from the polymer dispersion, a water-immiscible organic solvent, such as benzene, toluene, hexane, heptane and the like, being employed for the polymerization of acrylic acid, and water or a liquid similar to water being employed for the polymerization of the acrylate. Of the two crosslinked homopolymers, namely the homopolymer of acrylic acid and the homopolymer of an alkali metal acrylate, the homopolymer first mentioned is preferred for the purposes of the invention. The copolymer is prepared by copolymerizing acrylamide and acrylic acid or an alkali metal acrylate in the presence of a free-radical initiator and one of the abovementioned crosslinking agents and by isolating the pulverulent copolymer from the copolymer dispersion; the copolymerization too is carried out by means of suitable solvents (cf. the two U.S. patents mentioned above). A further method for the preparation of the copolymer is described in detail in U.S. Pat. No. 4,237,249. In accordance with this, acrylamide is polymerized in the presence of a free-radical initiator and one of the abovementioned crosslinking agents in a water-miscible alcohol, and the resulting polymer dispersion is treated with an alkali metal hydroxide, preferably sodium hydroxide or potassium hydroxide, in order to saponify an appropriate amount of the amide groups so as to obtain, in addition, the desired percentages by weight of alkali metal acrylate groups, after which the pulverulent acrylamide/alkali metal acrylate copolymer is isolated. Of the two crosslinked copolymers, namely the copolymer formed from acrylic acid and acrylamide and the copolymer formed from an alkali metal acrylate and acrylamide, the alkali metal acrylate/acrylamide copolymer prepared by the method of U.S. Pat. No. 4,237,249 is preferred for the purposes of the invention. As is apparent from U.S. Pat. Nos. 2,798,053, 2,923,692 and 4,237,249, suitable crosslinking agents are those belonging to the group of polyunsaturated (preferably di-unsaturated to penta-unsaturated) hydrocarbons, such as vinylbenzene, divinylnaphthalene and polybutadiene, the group of polyunsaturated (preferably di-unsaturated to penta-unsaturated) esters, such as allyl acrylate, crotyl acrylate, ethylene glycol diacrylate, glycerol diacrylate, glycerol triacrylate, diallyl phthalate, diallyl oxalate, diallyl citrate and triallyl citrate and also the corresponding methacrylates and methallyl esters, and the group of polyunsaturated (preferably di-unsaturated to penta-unsaturated) ethers, such as diallyl ether, diallyl ethylene glycol ether, diallyl propylene glycol ether, diallyl or triallyl ethers of trimethylolethane or trimethylolpropane, diallyl or triallyl ethers of glycerol (also polyglycerol, preferably diglycerol to decaglycerol), tetraallyloxethane and di-, tri-, tetra or penta-allyl ethers of alcohols of the sugar series, such as erythritol, pentaerythritol, arabitol, xylitol, dulcitol, mannitol, sorbitol, glucose and sucrose and also the corresponding methallyl ethers. Preferred crosslinking agents are those belonging to the group of polyunsaturated ethers, amongst which diallyl ether, diallyl or triallyl glycerol ether, diallyl or triallyl trimethylolethane ether, diallyl or triallyl trimethylolpropane ether, tetrallyloxethane and the di-, tri-, tetra- or penta-allyl ethers of sugar alcohols and also the corresponding methallyl ethers are particularly preferred. In general, the amount of crosslinking agent in the homopolymer and in the copolymer is 0.1 to 10% by weight, preferably 1 to 5% by weight, relative to the homopolymer or copolymer, respectively. The crosslinked homopolymer to be employed in accordance with the invention is essentially composed, accordingly, of a polymerized alkali metal acrylate (the alkali metal is preferably K or Na) or polymerized acrylic acid (as the main constituent) and 0.1 to 10% by weight, preferably 1 to 5% by weight, of polymerized crosslinking agent, the percentages by weight relating to the polymer, or, expressed in other terms, composed of 90 to 99.9% by weight, preferably 95 to 99% by weight, of a polymerized alkali metal acrylate or polymerized acrylic acid and 0.1 to 10% by weight, preferably 1 to 5% by weight, of polymerized crosslinking agent, the percentages by weight relating to the polymer. Of the two polymers—as already mentioned above, the polymer containing acrylic acid as the main constituent (the acrylic acid homopolymer) is preferred. According to the description above, the crosslinked copolymer to be employed in accordance with the invention is essentially composed of 10 to 90% by weight, preferably 20 to 80% by weight, of a polymerized alkali metal acrylate (the alkali metal is preferably K or Na) or polymerized acrylic acid and 10 to 90% by weight, preferaby 20 to 80% by weight, of polymerized acrylamide and also 0.1 to 10% by weight, preferably 1 to 5% by weight, of polymerized crosslinking agent, the percentages by weight relating to the polymer (i.e. the sum of the polymerized alkali metal acrylate or acrylic acid, the acrylamide and the crosslinking agent is 100% by weight); expressed in other terms, the crosslinked copolymer is essentially composed of, for example, 10 to 89.9% by weight, preferably 20 to 75% by weight, of a polymerized alkali metal acrylate or acrylic acid, 10 to 89.9% by weight, preferably 20 to 75% by weight, of polymerized acrylamide and 0.1 to 10% by weight, preferably 1 to 5% by weight, of polymerized crosslinking agent, the percentages by weight relating to the polymer. Of the two polymers—as already mentioned above—the polymer formed from the alkali metal acrylate, acrylamide and crosslinking agent and prepared by the process of U.S. Pat. No. 4,237,249, is preferred.

The component (c) of the de-icing and anti-icing agent according to the invention is preferably a potassium and/or sodium alkylarylsulfonate containing one or more, preferably 1 or 2, sulfonate groups ($SO_3K-$ or $SO_3Na-$ groups), one or more, preferably one or two, alkyl groups having 5 to 18, preferably 12 to 18, carbon atoms, and one or more, preferably one or 2, benzene rings. Potassium alkylbenzenesulfonates and/or sodium alkylbenzenesulfonates having 12 to 18 carbon atoms in the alkyl group are preferred (they contain one $SO_3K-$ or $SO_3Na-$ group and one alkyl group). Since hydrocarbon mixtures such as are obtained, for example, as fractions in the distillation of petroleum are also used in the preparation of alkylarylsulfonates, the alkyl group can also represent a mixture of this type; the number of carbon atoms in this product is preferably 12 to 18, i.e. an average number of 15). The alkali metal alkylarylsulfonates to be used as the component (c) are known and are commercially available (cf. U.S. Pat. No. 4,358,389).

The component (d) embraces corrosion inhibitors such as are customary for liquids based on glycols and water. Suitable corrosion inhibitors are those belonging to the group of alkali metal salts of fatty acids, preferably the sodium or potassium salt of lauric, palmitic, stearic, benzoic and oleic acid; to the group of monoalkylamines and dialkylamines (if appropriate alkoxylated) and salts thereof with mineral or fatty acids, preferably butylamine, hexylamine, octylamine, isononylamine, oleylamine, dipropylamine and dibutylamine; and to the group of triazoles, preferably benzotriazole and tolyltriazole. Of the corrosion inhibitors mentioned, it is preferable to employ the triazoles; benzotriazole is particularly preferred.

The component (e) by means of which the pH of the agent according to the invention is adjusted to a value of 7.5 to 11, preferably 8 to 10, is composed of a representative of each of three groups of alkaline compounds. The three groups embrace: ($e_1$) ammonia, monoethanolamine, diethanolamine or triethanolamine or a mixture of two or more of these compounds; ($e_2$) KOH and ($e_3$) an alkali metal hydroxide other than KOH, preferably NaOH. The representatives of the three groups of alkaline compounds are, as indicated above, each employed in a specific amount (expressed in percentages by weight relative to the weight of the finished agent). A further decisive factor is that the pH indicated shall be achieved. If, therefore, the pH indicated is not achieved, for example when the smallest amount of each of the three representatives is employed, an appropriately higher amount of at least one of them must be taken. If, on the other hand, a pH higher than 11, preferably 10, were to exist if the largest amount of each of the three representatives were employed, it would be necessary to take an appropriately smaller amount of at least one of the three representatives. It is advantageous to employ KOH and the other alakli metal hydroxides (for example NaOH) within the quantity ranges indicated in a ratio by weight of at least 2:1, that is to say at least two parts by weight of KOH are present for one part by weight of NaOH (as the other alkali metal hydroxide). The amines and the ammonia and also the alkali metal hydroxides are preferably employed in the form of a 10 to 40% strength by weight aqueous solution. The component (f) is water. It is preferable to use water which has been demineralized, for example by treatment with ion exchangers or by distillation.

The preparation of the de-icing and anti-icing agent according to the invention is effected, in principle, by mixing the individual components in any desired sequence. This can be carried out, for example, in a container equipped with a stirrer, if appropriate while heating to about 60° C. The following procedure is adopted in an advantageous mode of preparation, by means of which it is possible to achieve a relatively rapid dissolution of the individual components: the water (component f) is initially placed in a container at room temperature, and the thickener (component b) is added with stirring. It is expedient to continue stirring for some time after the addition, until a homogeneous solution is present. The alkylarylsulfonate (component c) and the corrosion inhibitor (component d) are then mixed in, with stirring, and the glycol (component a) is then introduced, also with stirring. The neutralizing agent (component e) is then added, again with stirring, the potassium hydroxide being taken as the last of the three neutralizing agents, in order to adjust the pH to the indicated value.

The de-icing and anti-icing agent according to the invention is distinguished by a long holdover time, a good viscosity behavior, optimum rheological properties, good stability to heat and high shear stability. It also has a relatively large depression of freezing point, a good wetting action, only a slightly hydrophilic character, high heat stability, suitability for storage for very long periods, even at high temperatures, and a good anti-corrosive character. In general, it displays excellent compatibility with all materials of aircraft construction, as required by the manufacturers of aircraft. When applied to aircraft, it is also distinguished by being readily sprayable and by very advantageous run-off properties during the take-off of the aircraft. In addition, the new agent also meets the requirements mentioned initially for use at temperatures of −15° C. or below. It can also be employed without problems in arctic regions and exhibits the special properties required at these low temperatures. In particular, it also has an optimum viscosity behavior, even at low temperatures and low shear rates, and thus ensures the desired rapid run-off during the take-off procedure even under these extreme conditions.

When the de-icing and anti-icing agent according to the invention is used, it is expedient to dilute it with water, preferably in a ratio of 75 (agent) : 25 (water) or 50:50. It is sprayed in this diluted form onto the surfaces to be treated by means of the customary equipment. When de-icing aircraft, the dilute solution is, as a rule, warmed to 50° to 95° C. before being sprayed on. It is expedient to employ the undiluted product for protecting the de-iced surfaces.

The invention will now be illustrated in greater detail by means of examples:

EXAMPLE 1

An agent according to the invention was prepared by mixing the following components:

(a)
  40.00% by weight of diethylene glycol and
  10.00% by weight of propylene glycol
(b)
  0.03% by weight of a crosslinked sodium acrylate/acrylamide copolymer composed essentially of 20% by weight of polymerized sodium acrylate, 78% by weight of polymerized acrylamide and 2% by weight of polymerized crosslinking agent (prepared by the process of U.S. Pat. No. 4,237,249) and
  0.20% by weight of a crosslinked acrylic acid polymer composed essentially of 98% by weight of polymerized acrylic acid and 2% by weight of polymerized crosslinking agent (the ratio by weight of the two polymers is thus 1:6.6); the two polymers, each in a 0.5% strength by weight aqueous solution at 20° C. and pH 7, had a Brookfield viscosity of 45,000 mPa s at 20 r.p.m. and a 15 laminar flow behavior up to a shear rate of 20,000 seconds$^{-1}$
(c)
  0.15% by weight of sodium alkylbenzenesulfonate having an average of 15 carbon atoms in the alkyl group
(d)
  0.03% by weight of benzotriazole
(e)
  0.05% by weight of triethanolamine
  0.03% by weight sodium hydroxide and
  0.11% by weight of potassium hydroxide and
(f)
  49.40% by weight of water.

The components (a) to (f) were mixed by means of a stirrer at room temperature in a container. The bulk of water was initially taken and the thickener, i.e. the two crosslinked acrylic polymers, was added with stirring. When the addition was complete, stirring was continued until the solution was homogeneous. The alkylbenzenesulfonate, the glycol, the corrosion inhibitor and the neutralizing agent were then mixed in and stirring was again continued until the solution was homogeneous. The three neutralizing agents were mixed in in the sequence indicated, the sodium hydroxide and the potassium hydroxide being employed in the form of an approximately 30% strength by weight aqueous solution, which had been prepared with the remainder of the water. The finished mixture had a pH of 8. The de-icing and anti-icing agent according to the invention had the following properties: the holdover time as determined by the high humidity holdover test (described as test 1 below) was over 8 hours. The holdover time as determined by the freezing rain endurance test (described as test 2 below) was 37 minutes (see page 18 for the mode of carrying out the two tests). The flow behavior in the rotational viscometer at shear rates of up to 20,000 seconds$^{-1}$ was laminar. The viscosity values at various temperatures and very low shear rates (the Brookfield viscosities at 0.3 r.p.m., corresponding to a shear rate of 0.08 seconds$^{-1}$) are shown below:

| Temperature (°C.) | Brookfield viscosity at 0.3 r.p.m. (mPa s) |
| --- | --- |
| +20 | 9,000 |
| 0 | 15,000 |
| −10 | 20,000 |
| −25 | 30,000 |
| −35 | 45,000. |

EXAMPLE 2

An agent according to the invention was prepared by mixing the following components:
(a)
  58.00% by weight of diethylene glycol
(b)

0.08% by weight of a crosslinked sodium acrylate/acrylamide copolymer composed essentially of 37% by weight of polymerized sodium acrylate, 60% by weight of polymerized acrylamide and 3% by weight of polymerized crosslinking agent (prepared by the process of U.S. Pat. No. 4,237,249) and 0.62% by weight of a crosslinked acrylic acid polymer composed essentially of 97% by weight of polymerized acrylic acid and 3% by weight of polymerized crosslinking agent (the ratio by weight of the two polymers is thus 1:7.8); the two polymers, each in a 0.5% strength by weight aqueous solution at 20° C. and pH 7, had a Brookfield viscosity of 15,000 mPa s at 20 r.p.m. and a laminar flow behavior up to a shear rate of 20,000 seconds$^{-1}$ (c)
0.50% by weight of sodium alkylbenzenesulfonate having an average of 15 carbon atoms in the alkyl group (d)
0.10% by weight of benzotriazole (e)
0.40% by weight of triethanolamine
0.08% by weight of sodium hydroxide and
0.35% by weight of potassium hydroxide and (f)
39.87% by weight of water.

The components (a) to (f) were mixed as in Example 1.

The finished mixture had a pH of 9.5. The de-icing and anti-icing agent according to the invention had the following properties: the holdover time as determined in test 1 was over 8 hours. The holdover time as determined in test 2 was 33 minutes. The flow behavior in a rotational viscometer at shear rates of up to 20,000 seconds$^{-1}$ was laminar. The viscosity values, measured as in Example 1, are shown below:

| Temperature (°C.) | Brookfield viscosity at 0.3 r.p.m. (mPa s) |
| --- | --- |
| +20 | 11,000 |
| 0 | 15,000 |
| −10 | 17,000 |
| −25 | 25,000 |
| −35 | 40,000. |

EXAMPLE 3

An agent according to the invention was prepared by mixing the following components:

(a)
40.00% by weight of propylene glycol (b)
0.04% by weight of a crosslinked sodium acrylate/acrylamide copolymer composed essentially of 10% by weight of polymerized sodium acrylate, 89% by weight of polymerized acrylamide and 1% by weight of polymerized crosslinking agent (prepared by the process of U.S. Pat. No. 4,237,249) and 0.10% by weight of a crosslinked acrylic acid polymer composed essentially of 97% by weight of polymerized acrylic acid and 3% by weight of polymerized crosslinking agent (the ratio by weight of the two polymers is thus 1:2.5); the two polymers, each in a 0.5% strength by weight aqueous solution at 20° C. and pH 7, had a Brookfield viscosity at 20 r.p.m. of 8,000 mPa s and 50,000 mPa s, respectively, and a laminar flow behavior up to a shear rate of 20,000 seconds$^{-1}$ (c) 0.07% by weight of sodium alkylbenzenesulfonate having an average of 15 carbon atoms in the alkyl group (d) 0.02% by weight of benzotriazole (e)
0.03% by weight of monoethanolamine
0.02% by weight of sodium hydroxide and
0.10% by weight of potassium hydroxide and (f) 59.62% by weight of water.

The components (a) to (f) were mixed as in Example 1. The finished mixture had a pH of 8. The de-icing and anti-icing agent according to the invention had the following properties: the holdover time as determined in test 1 was over 8 hours. The holdover time as determined in test 2 was 32 minutes. The flow behavior in a rotational viscometer at shear rates of up to 20,000 seconds$^{-1}$ was laminar. The viscosity values, measured as in Example 1, are shown below:

| Temperature (°C.) | Brookfield viscosity at 0.3 r.p.m. (mPa s) |
| --- | --- |
| +20 | 9,000 |
| 0 | 17,000 |
| −10 | 21,000 |
| −25 | 36,000 |
| −35 | 47,000. |

EXAMPLE 4

An agent according to the invention was prepared by mixing the following components:

(a)
45.00% by weight of diethylene glycol and
24.00% by weight of propylene glycol (b)
0.15% by weight of a crosslinked sodium acrylate/acrylamide copolymer composed essentially of 48% by weight of polymerized sodium acrylate, 50% by weight of polymerized acrylamide and 2% by weight of polymerized crosslinking agent (prepared by the process of U.S. Pat. No. 4,237,249) and 0.75% by weight of a crosslinked acrylic acid polymer composed essentially of 95% by weight of polymerized acrylic acid and 5% by weight of polymerized crosslinking agent (the ratio by weight of the two polymers is thus 1:5); the two polymers, each in a 0.5% strength by weight aqueous solution at 20° C. and pH 7, had a Brookfield viscosity of 60,000 mPa s at 20 r.p.m. and a laminar flow behavior up to a shear rate of 20,000 seconds$^{-1}$ (c) 0.80% by weight of sodium alkylbenzenesulfonate having an average of 15 carbon atoms in the alkyl group (d) 0.04% by weight of benzotriazole (e) 0.80% by weight of diethanolamine
0.12% by weight of sodium hydroxide and
0.30% by weight of potassium hydroxide and (f) 28.04% by weight of water.

The components (a) to (f) are mixed as in Example 1.
The finished mixture had a pH of 10.5. The de-icing and anti-icing agent according to the invention had the following properties: the holdover time as determined in test 1 was over 8 hours. The holdover time as determined in test 2 was 36 minutes. The flow behavior in a rotational viscometer at shear rates of up to 20,000 seconds$^{-1}$ was laminar. The viscosity values, measured as in Example 1 are shown below:

| Temperature (°C.) | Brookfield viscosity at 0.3 r.p.m. (mPa s) |
|---|---|
| +20 | 10,000 |
| 0 | 18,000 |
| −10 | 22,000 |
| −25 | 32,000 |
| −35 | 48,000 |

EXAMPLE 5

Example 2 was repeated, with the difference that a crosslinked sodium acrylate/acrylamide copolymer composed essentially of 78% by weight of polymerized sodium acrylate, 20% by weight of polymerized acrylamide and 2% by weight of polymerized crosslinking agent (prepared by the process of U.S. Pat. No. 4,237,249) was employed as component (b), and 0.40% by weight of ammonia, 0.08% by weight of sodium hydroxide and 0.35% by weight of potassium hydroxide were employed as component (e). In respect of pH, holdover time and flow behavior in a rotational viscometer, the finished mixture had the same values and properties as the mixture of Example 2. Its viscosity values, measured as in Example 1, are shown below:

| Temperature (°C.) | Brookfield viscosity at 0.3 r.p.m. (mPa s) |
|---|---|
| +20 | 10,000 |
| 0 | 14,000 |
| −10 | 16,000 |
| −25 | 20,000 |
| −35 | 32,000. |

EXAMPLE 6

Example 4 was repeated, with the difference that a crosslinked sodium acrylate/acrylamide copolymer composed essentially of 88% by weight of polymerized sodium acrylate, 10% by weight of polymerized acrylamide and 2% by weight of polymerized crosslinking agent (prepared by the process of U.S. Pat. No. 4,237,249) was employed as component (b) and 0.80% by weight of ammonia, 0.12% by weight of sodium hydroxide and 0.30% by weight of potassium hydroxide were employed as component (e).

In respect of pH, holdover time and flow behavior in a rotational viscometer, the finished mixture had the same values and properties as the mixture of Example 4. Its viscosity values, measured as in Example 1, are shown below:

| Temperature (°C.) | Brookfield viscosity at 0.3 r.p.m. (mPa s) |
|---|---|
| +20 | 9,000 |
| 0 | 16,000 |
| −10 | 20,000 |
| −25 | 25,000 |
| −35 | 32,000 |

COMPARISON EXAMPLE

An agent is prepared as claimed in U.S. Pat. No. 4,358,389 by mixing the following components:
(a) 58.00% by weight of diethylene glycol
(b) 0.70% by weight of a crosslinked acrylic acid polymer essentially of 97% by weight of polymerized acrylic acid and 3% by weight of polymerized crosslinking agent; the polymer, in a 0.5% strength by weight aqueous solution at 20° C. and pH 7, had a Brookfield viscosity at 20 r.p.m. of 15,000 mPa s and a laminar flow behavior up to a shear rate of 20,000 seconds$^{-1}$
(c) 0.50% by weight of a sodium alkylbenzenesulfonate having an average of 15 carbon atoms in the alkyl group
(d) 0.10% by weight of benzotriazole
(e) 0.43% by weight of potassium hydroxide and
(f) 40.27% by weight of water.

The mixing of the components (a) to (f) was effected analogously to Example 1.

The finished mixture had a pH of 9.4. The de-icing and anti-icing agent had the following properties: the holdover time as determined in test 1 was over 8 hours. The holdover time as determined in test 2 was 36 minutes. The flow behavior in a rotational viscometer was laminar at shear rates of up to 20,000 seconds$^{-1}$. The viscosity values at various temperatures and very low shear rates (the Brookfield viscosity at 0.3 r.p.m., corresponding to a shear rate of 0.08 seconds$^{-1}$) are shown below:

| Temperature (°C.) | Brookfield viscosity at 0.3 r.p.m. (mPa s) |
|---|---|
| +20 | 11,000 |
| 0 | 18,000 |
| −10 | 27,000 |
| −25 | 58,000 |
| −35 | 85,000. |

The holdover time was determined as specified in the most recent method, which is very rigorous, namely as specified in the "Recommendations for de-icing/anti-icing of aircraft on ground", 2nd edition, Sept. 1st, 1983, part 1, i.e. "Material specification de-/anti-icing fluid, aircraft", published by the Association of European Airlines (AEA). Following these recommendations, in the case of liquids of type II (de-icing and anti-icing liquids), the holdover time is determined by the so-called "High Humidity Holdover" test and "Freezing Rain Endurance" test. The test first mentioned is satisfied if the holdover time is at least 8 hours, and the second test is satisfied if the holdover time is at least 30 minutes.

The examples according to the invention and the comparison example illustrate, inter alia, the conclusion summarized below:

The de-icing and anti-icing agent disclosed in U.S. Pat. No. 4,358,389 admittedly displays the laminar flow behavior and good holdover time values required, and it also satisfies the present requirement for viscosity at the very low shear rate of 0.08 seconds$^{-1}$ (corresponding to 0.3 r.p.m. on the Brookfield viscometer) and at temperatures down to about −15° C.; however, its viscosity at temperatures lower than about −15° C., and especially at temperatures of about −20° to about −35° C., and at the low shear rate mentioned is considerably above the values required. Thus, at −25° C. and the low shear rate mentioned, the known agent has a viscosity considerably above 50,000 mPa s (according to the regulations of the Association of European Airlines this viscosity must not exceed 50,000 mPa s).

In contrast with this, the de-icing and anti-icing agent according to the invention not only has good holdover time values, the laminar flow behavior required and very good (low) viscosity values at a low shear rate and at temperatures down to about −15° C., it also meets all the further requirements described initially and the requirements of the AEA to an unexpectedly high extent. Thus, at −25° C. and a shear rate of 0.08 seconds−1 (corresponding to 0.3 r.p.m. on the Brookfield viscometer), it has viscosity values (low shear viscosity at −25° C.) which are considerably less than 50,000 mPa s. The feature that distinguishes the agent according to the invention particularly, is that, inter alia, it also has a relatively low viscosity at −35° C. (a temperature which is not even contained in the regulations of the AEA), and also has this viscosity at the very low shear rate of 0.08 seconds−1; under these extreme conditions its viscosity is somewhat less than 50,000 mPa s. The de-icing and anti-icing agent according to the invention thus ensures a safe take-off of the aircraft even at temperatures down to −35° C.

We claim:

1. De-icing and anti-icing agent for aircraft, based on glycols and water and containing crosslinked acrylic polymers as the thickener, consisting essentially of:
   (a) 40 to 70% by weight of a glycol having an alkylene chain of 2 to 3 carbon atoms or a oxalkylene glycol having 4 to 6 carbon atoms,
   (b) 0.1 to 1% by weight of crosslinked acrylic polymers consisting essentially of 1 part by weight of a crosslinked copolymer formed from acrylic acid or an alkali metal acrylate and acrylamide and containing 10 to 90% by weight of copolymerized units of acrylic acid or alkali metal acrylate and 10 to 90% by weight of copolymerized units of acrylamide and 1 to 10 parts by weight of a crosslinked homopolymer of acrylic acid or an alkali metal acrylate, subject to the proviso that the homopolymer and the copolymer each have a viscosity of 5000 to 70,000 mPa s and a laminar flow behavior at a shear rate of 0 to 20,000 seconds−1, the viscosity and the laminar flow behavior each being determined using a 0.5% strength by weight aqueous solution at 20° C. and a pH of 7 by means of a Brookfield viscometer at 20 r.p.m. and a rotational viscometer for shear rates of up to 20,000 seconds−1, respectively,
   (c) 0.05 to 1% by weight of a surfactant consisting essentially of an alkali metal alkylarylsulfonate,
   (d) 0.01 to 1% by weight of at least one corrosion inhibitor,
   (e) the three following basic compounds ($e_1$) to ($e_3$) in the amounts indicated, in order to adjust the pH of the agent to a value of 7.5 to 11,
      ($e_1$) 0.03 to 1% by weight of ammonia, monoethanolamine, diethanolamine or triethanolamine or a mixture thereof,
      ($e_2$) 0.10 to 0.7% by weight of potassium hydroxide and
      ($e_3$) 0.02 to 0.5% by weight of a further alkali metal hydroxide, and
   (f) water as the remaining percentage by weight, the percentages by weight relating in each case to the weight of the agent.

2. An agent as claimed in claim 1, wherein the crosslinked copolymer consists essentially of 20 to 80% by weight of copolymerized units of acrylic acid or an alkali metal acrylate and 20 to 80% by weight of copolymerized units of acrylamide.

3. An agent as claimed in claim 1, wherein 3 to 8 parts by weight of the crosslinked homopolymer are present for 1 part by weight of the crosslinked copolymer.

4. An agent as claimed in claim 1, wherein the crosslinked homopolymer and the crosslinked copolymer each have a viscosity of 10,000 to 50,000 mPa s.

5. An agent as claimed in claim 1, wherein the crosslinked homopolymer is a crosslinked acrylic acid homopolymer and the crosslinked copolymer is a crosslinked alkali metal acrylate/acrylamide copolymer.

6. An agent as claimed in claim 1, wherein the crosslinked homopolymer and the crosslinked copolymer contain 0.1 to 10% by weight of crosslinking agent, relative to the homopolymer or copolymer respectively.

7. An agent as claimed in claim 1, wherein the crosslinked homopolymer and the crosslinked copolymer contain 1 to 5% by weight of crosslinking agent, relative to the homopolymer or copolymer, respectively.

8. An agent as claimed in claim 1, which contains the components (a) to (f) in the quantities stated below:
   (a) 50.00 to 60.00% by weight
   (b) 0.20 to 0.70% by weight
   (c) 0.10 to 0.70% by weight
   (d) 0.03 to 0.50% by weight
   ($e_1$) 0.05 to 0.50% by weight
   ($e_2$) 0.07 to 0.14% by weight
   ($e_3$) 0.03 to 0.15% by weight
   (f) water as the remainder.

* * * * *